United States Patent [19]
Richardson et al.

[11] 3,925,646
[45] Dec. 9, 1975

[54] INFORMATION AND PROCESS CONTROL ENHANCEMENT SYSTEM EMPLOYING SERIES OF SQUARE WAVE COMPONENTS

[75] Inventors: Richard L. Richardson, Kennewick; Bernard P. Hildebrand, Richland; Robert E. Mahan, Kennewick, all of Wash.

[73] Assignee: Battelle Memorial Institute, Columbus, Ohio

[22] Filed: Apr. 19, 1974

[21] Appl. No.: 462,372

[52] U.S. Cl. .................................. 235/152; 328/167
[51] Int. Cl.$^2$ .......................................... G06F 15/34
[58] Field of Search ............ 235/152, 156; 328/167, 328/165; 343/5 DP

[56] References Cited

UNITED STATES PATENTS

| | | | |
|---|---|---|---|
| 3,705,981 | 12/1972 | Harmuth | 235/193 |
| 3,821,527 | 6/1974 | Kang | 235/152 |

OTHER PUBLICATIONS

H. Gethoffer, "Mutual Mapping of Generalized Convolution Systems", Applications of Walsh Functions 1972 Proceeding, Mar. 1972, pp. 310–317.

*Primary Examiner*—David H. Malzahn
*Attorney, Agent, or Firm*—Klarquist, Sparkman, Campbell, Leigh, Hall & Whinston

[57] ABSTRACT

An input signal is spectrally decomposed into a plurality of square waves each defined as a given Walsh function, while a second signal, representative of a desired or undesired element in the first signal is similarly transformed to provide a second combination of square waves, each defining a Walsh function. The reciprocal of the last mentioned combination is obtained for multiplication with the first series of square waves for providing a filtered version of the original input signal.

18 Claims, 11 Drawing Figures

INFORMATION AND PROCESS CONTROL ENHANCEMENT SYSTEM EMPLOYING SERIES OF SQUARE WAVE COMPONENTS

BACKGROUND OF THE INVENTION

Linear and nonlinear processing or filtering of an input signal having one or more dimensions is facilitated by spectral decomposition thereof, while computing devices are suitably employed to process the various spectral components. Processing of complex inputs, e.g., two dimensional images, was formerly considered impractical because of the long operating times required, but has now been made possible by the rediscovery of the Fast Fourier Transform algorithm. However, it would be preferably for the sake of speed and simplicity in the realm of computers to work entirely with binary functions rather than continuous functions.

A class of filtering which may be termed inverse filtering involves recovery of an input signal in the presence of signal degradation, multiplicative noise, and the like. In a Fourier Transform system, an original input signal is theoretically restored by multiplying its Fourier spectrum point by point with a transfer function comprising the reciprocal of the Fourier Transform of the degrading mechanism. This process fails in practice because it involves the inversion of zeros.

A complete set of binary functions called Walsh functions would be well suited to relatively simple computer operation inasmuch as a Walsh function comprises a square wave having but two amplitude values. However, inverse filtering for Walsh functions has not been considered possible because of a lack of a convolution theorem equivalent to the Fourier convolution theorem. As a result, only relatively complex Fourier analysis and approximation, or combinations of Walsh and Fourier analysis, have been considered practical in this area.

SUMMARY OF THE INVENTION

In accordance with the present invention, an input signal to be processed is converted to a form comprising a series of square wave spectral components which advantageously take the form of Walsh functions. The converted input is then multiplied in a multiplier circuit by the reciprocal of a second series of square waves to produce an output. This output may comprise a filtered or restored version of the input, unity when the first and second series of square waves are the same, or other desired result.

In particular, the reciprocal series of a series of Walsh functions representing the information to be filtered out is produced by an operation equivalent to solving a set of simultaneous equations for coefficients of the reciprocal series, the equations resulting from dyadically combined Walsh functions. The set of equations is in effect obtained from the multiplication of the proposed reciprocal Walsh series by the terms of the Walsh series representing the information to be filtered out, wherein the product includes Walsh functions identified by dyadic addition on series Walsh function subscripts. The resulting reciprocal Walsh series is then readily combined with a Walsh series representing the input. The whole filtering operation is simply and rapidly carried out employing binary apparatus.

It is accordingly an object of the present invention to provide an improved system for filtering or enhancing input information by spectral decomposition into square wave components and combination with other square wave components representative of noise or system degradation for the purpose of restoring the input.

It is another object of the present invention to provide a system for combining a square wave spectral decomposition of an input signal with the reciprocal of a square wave spectral decomposition of another signal.

It is another object of the present invention to provide computing apparatus which can operate in real-time for digitally accomplishing filtering of input signals having multiplied noise or the equivalent thereof.

It is a further object of the present invention to provide an improved control system employing computing apparatus which can operate on a real-time basis for producing a control function in response to the square wave spectral decomposition of a desired performance signal and a signal representative of resulting system operation.

The subject matter which we regard as our invention in particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

THEORETICAL BACKGROUND AND DEFINITIONS

The present system advantageously transforms input waveforms, or waveforms of information to be removed therefrom, into square wave components in the form of Walsh functions, rather than into sine wave components as in the case of Fourier Tranformation. A series of harmonically related square waves known as Rademacher functions exist wherein a single square wave cycle is expressed as $R_0$, two cycles as $R_1$, three cycles as $R_2$, etc. However, not every waveform can be simulated by a series of Rademacher functions.

Figure 1:
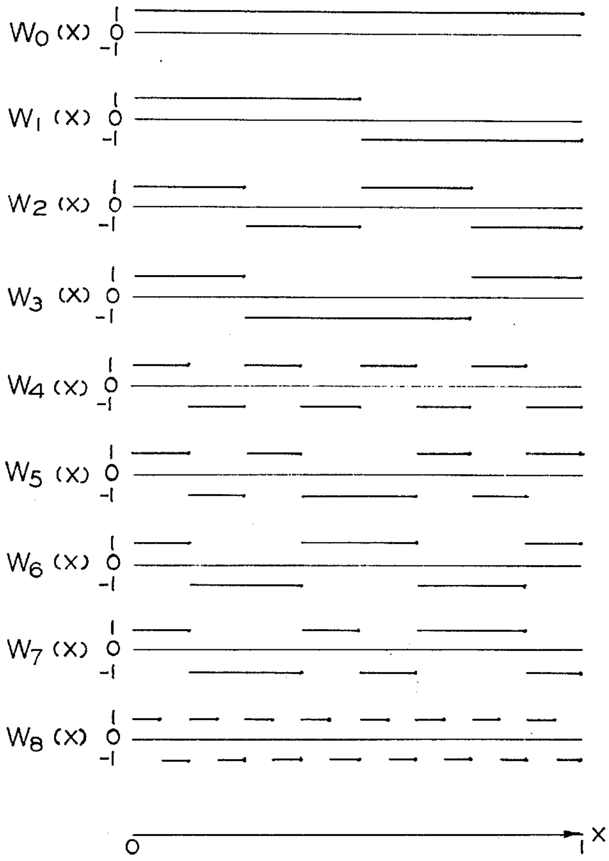
FIG. 1 is a chart of Walsh functions.

Walsh functions comprise a series of square waves of increasing "sequency" or axis crossings, which may be employed to simulate substantially any arbitrary waveform. The first few Walsh functions as defined herein are illustrated in FIG. 1.

Let $R_k(x)$ denote the Rademacher functions and $W_n(x)$ denote the Walsh functions for $0<x \leq 1$, $k=0,1,2,\ldots$.

Definition 1:

$$R_k(x) = \left\{ \begin{array}{l} 1 \text{ if } m \text{ is even} \\ -1 \text{ if } m \text{ is odd} \end{array} \right\}$$

$$m/2^{k+} < x \leq (m+1)/2^{k+1}$$
$$m = 0,1,2,\ldots,2^k-1$$

Thus we first let $k$ assume a given value, i.e. for the $k^{th}$ Rademacher function, and we then let $m$ take on the various values, 0, 1, 2, etc., so long as $x$ is greater than zero and less than or equal to 1. For example, the Rademacher function, $R_0$, will have the value +1 for 0 less than $x$ less than or equal to ½, and will have the value −1 for ½ less than $x$ less than or equal to 1. Walsh functions can be considered as being made up of Rademacher functions.

Definition 2:

$$W_n(x) = \Pi_{k=0}^{\infty}[R_k(x)]^{n_k}$$

$$n = \sum_{k=0}^{\infty} n_k 2^k, \quad n_k \in \{0,1\}$$

The Walsh function $W_n(x)$ thus equals a product of Rademacher functions, as follows:

$W_0(x) = 1$;
$W_1(x) = R_0(x)$;
$W_2(x) = R_1(x)$;
$W_3(x) = R_0(x)R_1(x)$;

starting at the lowest order digit in the subscript, the first and second digits are present.

In addition to the above definitions, the operation ♀ in the dyadic group is used to evaluate the Walsh function equivalent to the product of two Walsh functions.

Definition 3: For integers $m$ and $n$, $$m = \sum_{k=0}^{\infty} m_k 2^k,$$

$$n = \sum_{K=0}^{\infty} n_k 2^k,$$

$$m_k, n_k \in \{0,1\},$$

$$m \dotplus n = \sum_{k=0}^{\infty} (m_k \dotplus n_k) 2^k,$$

$$m_k \dotplus n_k = \left\{ \begin{array}{l} 0 \text{ if } m_k = n_k \\ 1 \text{ if } m_k \neq n_k \end{array} \right\}.$$

According to definition 3 if m and n are binary numbers, i.e., with their digits in the set 0, 1, then the dyadic sum, $m \dotplus n$, equals their binary sum without carries. Thus, in such a system, 7 ♀.12 = 11. An exclusive-or operation is performed on each of the binary representations, digit by digit.

| Thus, | |
|---|---|
| | 111 |
| | 1100 |
| | 1011 |

A property of the dyadic group useful in the sequel is: if A ♀ B = C then A = B ♀ C and B = A ♀ C for binary integers A, B and C. Thus, not only does 7 ♀ 12 = 11, but 12 ♀ 11 = 7, and 7 ♀ 12. A table of dyadic addition is given as follows:

Table I

| | | | | | | | Dyadic Addition | | | | | | | | | |
|---|---|---|---|---|---|---|---|---|---|---|---|---|---|---|---|---|
| ♀ | O | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 1 | 0 | 3 | 2 | 5 | 4 | 7 | 6 | 9 | 8 | 11 | 10 | 13 | 12 | 15 | 14 |
| 2 | 2 | 3 | 0 | 1 | 6 | 7 | 4 | 5 | 10 | 11 | 8 | 9 | 14 | 15 | 12 | 13 |
| 3 | 3 | 2 | 1 | 0 | 7 | 6 | 5 | 4 | 11 | 10 | 9 | 8 | 15 | 14 | 13 | 12 |
| 4 | 4 | 5 | 6 | 7 | 0 | 1 | 2 | 3 | 12 | 13 | 14 | 15 | 8 | 9 | 10 | 11 |
| 5 | 5 | 4 | 7 | 6 | 1 | 0 | 3 | 2 | 13 | 12 | 15 | 14 | 9 | 8 | 11 | 10 |
| 6 | 6 | 7 | 4 | 5 | 2 | 3 | 0 | 1 | 14 | 15 | 12 | 13 | 10 | 11 | 8 | 9 |
| 7 | 7 | 6 | 5 | 4 | 3 | 2 | 1 | 0 | 15 | 14 | 13 | 12 | 11 | 10 | 9 | 8 |
| 8 | 8 | 9 | 10 | 11 | 12 | 13 | 14 | 15 | 0 | 1 | 2 | 3 | 4 | 5 | 6 | 7 |
| 9 | 9 | 8 | 11 | 10 | 13 | 12 | 15 | 14 | 1 | 0 | 3 | 2 | 5 | 4 | 7 | 6 |
| 10 | 10 | 11 | 8 | 9 | 14 | 15 | 12 | 13 | 2 | 3 | 0 | 1 | 6 | 7 | 4 | 5 |
| 11 | 11 | 10 | 9 | 8 | 15 | 14 | 13 | 12 | 3 | 2 | 1 | 0 | 7 | 6 | 5 | 4 |
| 12 | 12 | 13 | 14 | 15 | 8 | 9 | 10 | 11 | 4 | 5 | 6 | 7 | 0 | 1 | 2 | 3 |
| 13 | 13 | 12 | 15 | 14 | 9 | 8 | 11 | 10 | 5 | 4 | 7 | 6 | 1 | 0 | 3 | 2 |
| 14 | 14 | 15 | 12 | 13 | 10 | 11 | 8 | 9 | 6 | 7 | 4 | 5 | 2 | 3 | 0 | 1 |
| 15 | 15 | 14 | 13 | 12 | 11 | 10 | 9 | 8 | 7 | 6 | 5 | 4 | 3 | 2 | 1 | 0 |

etc.

In definition 2 above, n is defined as a binary number, while $n_k$, being in the set of 0,1, is a binary digit corresponding to the $k^{th}$ Rademacher function. The definition will indicate that if the subscript for the given Walsh function is taken in binary notation, then the digits thereof will indicate the multiplicative presence of certain Rademacher function therein. Therefore, $W_3(x) = W_{11}(x)$ wherein the subscript is given in binary notation, and is indicative of the fact that such third Walsh function is provided by the product of the first and second Rademacher functions, $R_0$ and $R_1$. Thus, The following theorem, proven by N. J. Fine, "On the Walsh Functions," Transactions American Math Soc., Volume 65, pages 372–415, 1949, is useful in obtaining the product of two Walsh functions.

Theorem 1: $W_m(x)W_n(x) = W_{m \dotplus n}(x)$

Thus, there is a one-to-one correspondence between product operations on Walsh functions and dyadic addition of subscripts.

The definitions 1 and 2 yield a set of orthonormal (Walsh) functions that take on either the value (+1) or the value (−1) for each $x \in (0, 1)$. Consequently, each Walsh function is identical with its reciprocal. However, this is true of the individual Walsh functions and not of a series of Walsh functions.

DETAILED DESCRIPTION

Now we wish to spectrally decompose an input signal as well as information to be removed therefrom into respective series expansions of Walsh functions. Then, we wish to obtain the reciprocal of one series, in order to obtain a useful means of eliminating undesired features from the other series.

If a linear combination of Walsh functions for which we desire the reciprocal equals the summation from $j=0$ to N of $\alpha_j W_j(x)$, then we can express its reciprocal series as follows:

$$\sum_{k=0}^{M} a_k W_k(x) = \frac{1}{\sum_{j=0}^{N} \alpha_j W_j(x)}, \tag{1}$$

$\{a_k\}$, and M to be evaluated. Removing the devisor and using Theorem 1, $$\sum_{k=0}^{M} \sum_{j=0}^{N} a_k \alpha_j W_{k \oplus j}(x) = 1 . \tag{2}$$

The property of elements in the dyadic group mentioned in definition 3 is used to eliminate the index $j$, leaving the index $k$ in ascending order and arranging the index $k \oplus j$ in ascending order.

Let $l=k \oplus j$, then $j=l \oplus k$ and $$\sum_{l=0}^{\max (k \oplus j)} W_l(x) \sum_{k=0}^{M} a_k \alpha_{k \oplus l} = 1 .$$

The latter summation, from $k=0$ to M of $a_k\alpha_k$ 1, represents the coefficient sum of terms for each Walsh function in the series.

Linear independence of the Walsh function yields the set of equations:

$$\sum_{k=0}^{M} a_k \alpha_{k \oplus l} = \delta_{l,0} \; ; \; l = 0,1,2, \ldots , \max (k \oplus j) \tag{3}$$

$\delta_{l,0}$ is the Kronecker delta equalling 1 if $l$ equals 0 but is otherwise 0. For a given value of $l$, the summation if performed to provide an equation. Then the value of $l$ is changed and the summation repeated to yield a second equation, etc.

Expression (3) provides an evaluation of the$\{a_k\}$if $M+1=2^p$, p an integer. Adding $\alpha k \oplus_l = 0$ for $k \oplus 1 > N$ assures a square coefficient matrix yielding a unique solution set $\{a_k\}$ provided the determinant $a_k \oplus_l \neq 0$; i.e., the given Walsh series $\sum_{j=0} \alpha j W j(x) \neq 0$, for all $\epsilon(0,1)$. Symbolically, $$\sum_{k=0}^{2^p-1} a_k \alpha_{k \oplus l} = \delta_{l,0} \; ; \; l = 0,1,2, \ldots , 2^p-1 . \tag{4}$$

If $\alpha, \beta \epsilon$ where S is the set of Walsh function indices in the divisor series, then either S contains $\alpha \oplus \beta$ or S must be enlarged to contain $\alpha \oplus \beta$ for every pair $(\alpha,\beta)$ of indices in S. We say S is complete if it contains all the elements $(\alpha, \beta)$, $\alpha, \beta \epsilon S$. If we do not have a complete dyadic group of Walsh functions, then we may include further terms for completing the group. For example, if an expression (1), M=N=2, the complete dyadic group is not present according to the above criteria. With no loss or generality, we may then include the terms $\alpha_3 W_3(x)$ and $a_3 W_3(x)$ in the given functions and evaluate the $\{a_i\}$ in terms of the $\{\alpha_i\}$. Equations (1), (2), (3), and (4) in this discussion are evaluated with M=N=3, as follows:

$$\sum_{k=0}^{3} a_k W_k(x) = \frac{1}{\sum_{j=0}^{3} \alpha_j W_j(x)}, \{a_k\} \text{ unknown} . \tag{5}$$

Clearing fractions, $$\sum_{k=0}^{3} \sum_{j=0}^{3} a_k \alpha_j W_{k \oplus j}(x) = 1 \tag{6}$$

Let $l=j \oplus k$, then $j=l \oplus k$ and $\max (k \oplus j) = 3$:

$$\sum_{l=0}^{3} W_l(x) \sum_{k=0}^{3} a_k \alpha_{k \oplus l} = 1 . \tag{7}$$

Linear independence of the $W_l(x)$ assures that $$\sum_{k=0}^{3} a_k \alpha_{k \oplus l} = \delta_{l,0} \; , \; l = 0,1,2,3. \tag{8}$$

Expression (7) may be expanded as follows:

$$W_0 (a_0\alpha_0 + a_1\alpha_1 + a_2\alpha_2 + a_3\alpha_3) +$$
$$W_1 (a_0\alpha_1 + a_1\alpha_0 + a_2\alpha_3 + a_3\alpha_2) +$$
$$W_2 (a_0\alpha_2 + a_2\alpha_0 + a_1\alpha_3 + a_3\alpha_1) +$$
$$W_3 (a_0\alpha_3 + a_3\alpha_0 + a_1\alpha_2 + a_2\alpha_1) = 1$$

The equations defined by expression (8) may be written as follows:

$$a_0\alpha_0 + a_1\alpha_1 + a_2\alpha_2 + a_3\alpha_3 = 1$$
$$a_0\alpha_1 + a_1\alpha_0 + a_2\alpha_3 + a_3\alpha_2 + 0$$
$$a_0\alpha_2 + a_1\alpha_3 + a_2\alpha_0 + a_3\alpha_1 = 0$$
$$a_0\alpha_3 + a_1\alpha_2 + a_2\alpha_1 + a_3\alpha_0 = 0$$

The sum of the coefficients for $W_0$ are thus set equal to 1 and the sum of the coefficients for $W_1$, $W_2$, and $W_3$ are each set equal to zero, as agrees, for example, with the FIG. 1 representation of Walsh functions. Then these equations are solved simultaneously for the values for the $\{a_k\}$; for the desired reciprocal series.

If $\Delta = |\alpha_{k \oplus l}| \neq 0$, Cramer's rule yields values for the $\{a_k\}$ $a_k$ = Cofactor of element $(k,l)$ in $\Delta$ divided by $\Delta$.

The numbers are
$$\frac{1}{\Delta}\begin{vmatrix}\alpha_0\alpha_3\alpha_2\\ \alpha_3\alpha_0\alpha_1\\ \alpha_2\alpha_1\alpha_0\end{vmatrix}, \quad \frac{-1}{\Delta}\begin{vmatrix}\alpha_1\alpha_2\alpha_3\\ \alpha_3\alpha_0\alpha_1\\ \alpha_2\alpha_1\alpha_0\end{vmatrix}, \quad \frac{1}{\Delta}\begin{vmatrix}\alpha_1\alpha_2\alpha_3\\ \alpha_0\alpha_3\alpha_2\\ \alpha_2\alpha_1\alpha_0\end{vmatrix}, \quad \frac{-1}{\Delta}\begin{vmatrix}\alpha_1\alpha_2\alpha_3\\ \alpha_0\alpha_3\alpha_2\\ \alpha_3\alpha_0\alpha_1\end{vmatrix}$$

for $k = 0,1,2,$ and 3, respectively.

If x is sufficiently small, equation (5) will take on the value $$\frac{1}{\sum_{j=0}^{3} \alpha_j}$$

Thus, given the coefficients of the Walsh series expansion of the function $f(x)$, the algorithm described above provides the coefficients of the Walsh series expansion of the reciprocal $g(x)=1/f(x)$ by a simple, fast equation solving routine. The algorithm holds even for $g(x)$ non-square integrable.

The algorithm addresses itself to what has been considered a formidable problem, since the process of obtaining a series expansion for the reciprocal of a periodic function normally encounters difficulties when the function takes on the value 0. However, when the function is expressed in Walsh series and the algorithm is applied, singularities of the type present, for example, in $x/\sin x$ and $1/x$ are automatically taken care of without elaborate programming.

DESCRIPTION OF PREFERRED EMBODIMENTS

Figure 2:
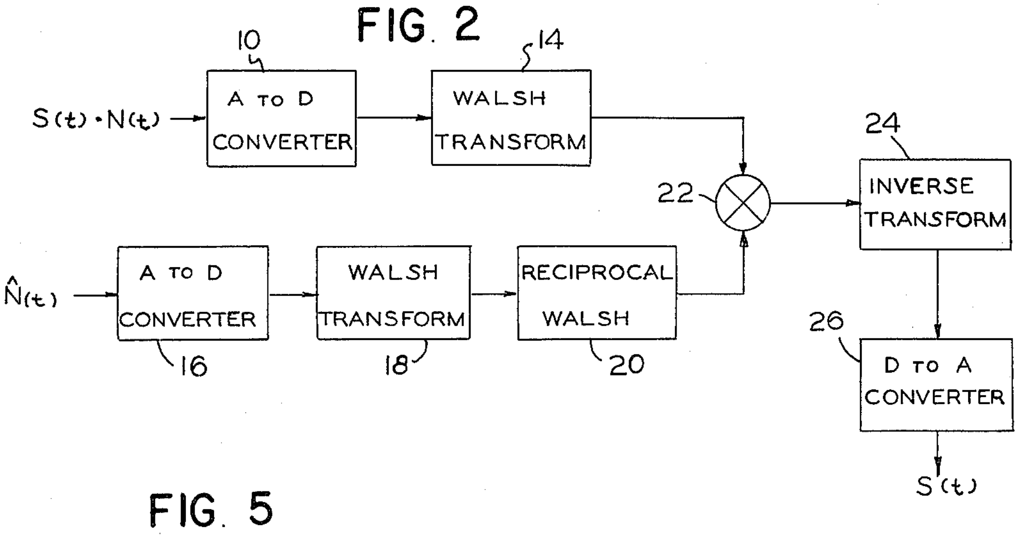
FIG. 2 is a block diagram of a first system according to the present invention.

FIG. 2 illustrates a system to provide inverse filtering for the elimination of multiplied noise, signal degradation, or the like. An input signal $S(t)$ is desired, but is contaminated with a noise factor $N(t)$. The present system provides an enhanced output by "dividing out" the undesired factor. It is assumed that the noise or degrading factor can be characterized or estimated as a signal $\hat{N}(t)$ which signal is used as an additional input in the filtering process to remove $N(t)$.

The contaminated signal in FIG. 2 is indicated as $S(t).\ N(t)$. This analog signal is applied to analog to digital converter 10 having input means which samples the analog signal to provide a time series of analog samples. The analog to digital converter converts the samples to a digital array of numbers, with each number comprising the digitized amplitude value of a sample. Sampling and conversion are repeated on a cyclical basis to provide successive digital arrays during successive intervals of time in a "real time" basis. Walsh transform converter 14 then provides the fast Walsh transform corresponding to each successive interval. The actual output of converter 14 comprises an array of numbers representing amplitude coefficients of various Walsh functions of the Walsh series into which the original input may be spectrally decomposed. Converter 14 is further illustrated in FIGS. 5 and 6, and will subsequently be described in connection therewith.

The noise estimate, $\hat{N}(t)$, is also coupled to an analog to digital converter 16 which samples the analog estimate, and converts the same to a second digital array, and Walsh transform converter 18 provides the fast Walsh transform corresponding to each successive interval of time. It will be understood Walsh transform converter 18 is suitably substantially identical to Walsh transform converter 14 hereinafter described. The output from Walsh transform converter 18 is coupled to reciprocal Walsh transform converter 20, also hereinafter described, which effectively provides an output array corresponding to the reciprocal series of the series representing the noise estimate, $\hat{N}(t)$. Then this reciprocal array is multiplied by the transform of the contaminated signal in multiplier 22 whereby to provide, for each interval, an array of numbers representing the Walsh transform of the desired signal, $S(t)$. The multiplication in multiplier 22 suitably follows Theorem 1 as hereinbefore described, i.e. the multiplication is carried out employing dyadic addition. The output of multiplier 22 comprises the amplitude coefficients of a number of square wave Walsh fucntions, which, when combined, would result in the desired waveform. The multiplication process with the reciprocal in multiplier 22 essentially "divides out" the undesired factor. The multiplier output is coupled to inverse transform converter 24 which then drives digital to analog converter 26, the output of which is the desired analog signal, $S(t)$, in continuous form, or a signal which is an enhanced analog replica of the original noisy input signal. While the apparatus is efficacious in removing multiplicative noise, exponentiation immediately following A to D converters 10 and 16 and a logarithmic converter just prior to D to A converter 26 will provide a system which filters added noise if such operation is desired.

In many instances it may be more suitable to provide an estimate or model of the desired input signal rather than an estimate of the noise. For example, in radar systems and the like, one will know the characteristics of the desired radar return. The system of FIG. 3 receives an input signal contaminated with noise, $S(t).N(t)$, and there is also provided an estimate, $\hat{S}(t)$ of the desired input signal. Arrow 28 indicates the signal estimate, $\hat{S}(t)$, is movable or adjustable in the time of periodic occurrence.

Figures 3, 4, 6:
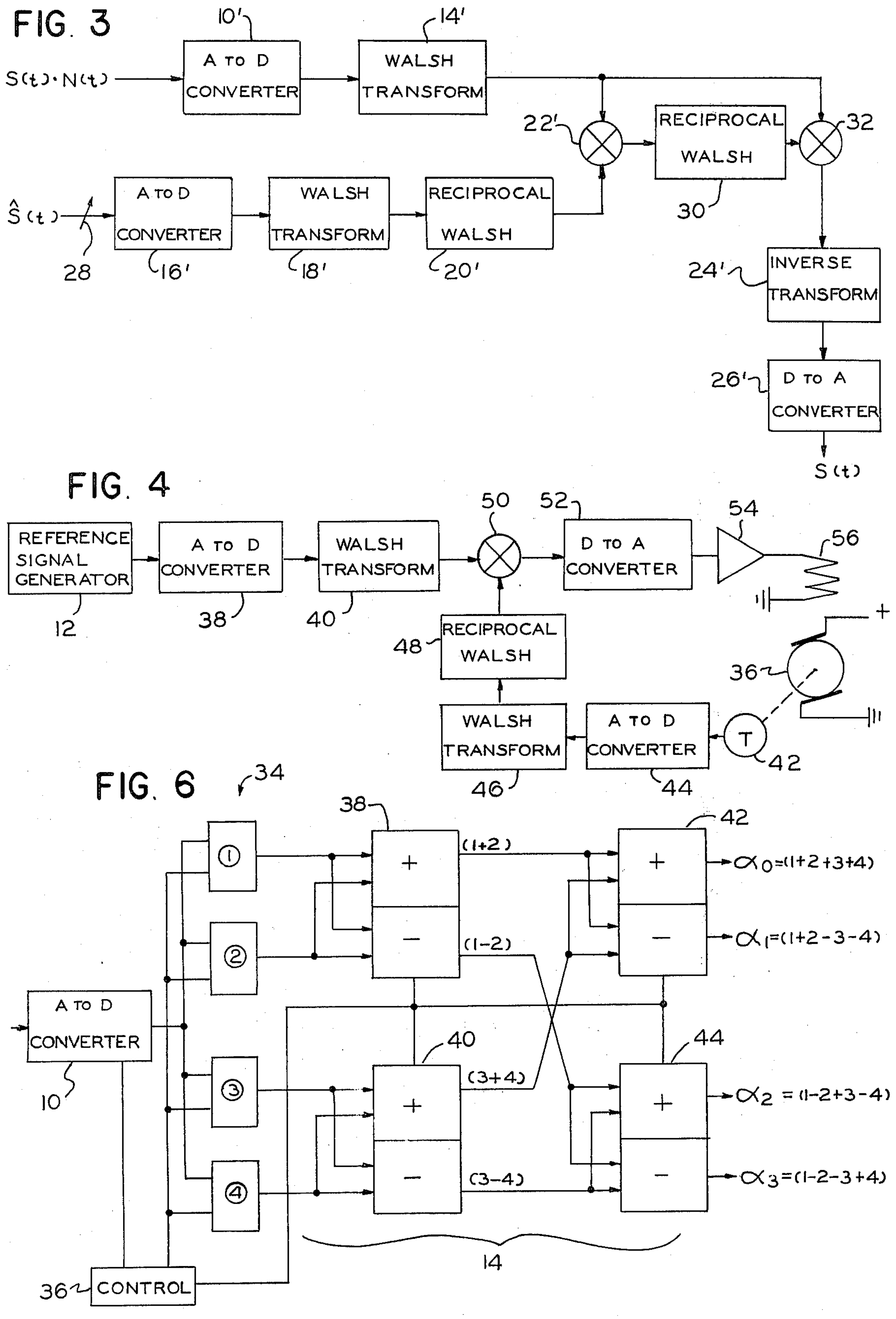
FIG. 3 is a block diagram of a second system according to the present invention.
FIG. 4 is a block diagram of a control system according to the present invention.
FIG. 6 is a block diagram illustrating the FIG. 5 apparatus in further detail and employing four input samples.

Various components of the FIG. 3 system are referred to employing primed reference numerals, wherein the elements may be substantially identical to elements in FIG. 2 identified by corresponding unprimed reference numerals. However, an additional reciprocal Walsh function converter 30 is employed in the FIG. 3 system for receiving the output of multiplier 22', and an additional multiplier 32 combines the output of converter 30 with the output of Walsh transform converter 14', the product being applied to inverse Walsh transform converter 24'.

The FIG. 3 system operates in the manner similar to that described in connection with FIG. 2 in that the contaminated signal, $S(t).N(t)$, is applied to analog to digital converter 10' which provides digital values corresponding to successive analog samples of the input during a time interval. Walsh transform converter 14' then supplies an array of Walsh coefficients representing the amplitudes of the Walsh functions into which the input is converted. Instead of receiving a model or estimate of the noise, A to D converter 16' receives a model or estimate, $\hat{S}(t)$, of the input signal which is shiftable in time, and provides a plurality of digital representations of those samples as an input to Walsh transform converter 18'. Converter 18', in turn, generates an array of coefficients of Walsh functions representative of model, $\hat{S}(t)$, and this array is applied to reciprocal Walsh converter 20' wherein Walsh coefficients are provided representing a reciprocal Walsh series. The Walsh array from converter 14' is multiplied by the Walsh array from converter 20' in multiplier 22′, but it will be realized that the signal is divided out this time, rather than the noise. Thus, the output of multiplier 22′ comprises an array of Walsh function coefficients which characterize the undesired noise or degrading factor. Such output is applied to a second reciprocal Walsh transform converter 30, which may be substantially similar to converter 20′, wherein coefficients of a Walsh series representing a reciprocal of a series representing the noise are generated. Thus, the output of converter 30 may be viewed as representative of $1/N$, and is combined in multiplier 32, i.e. by means of dyadic addition, with the output of Walsh transform converter 14′ to provide an array of coefficients of Walsh functions representing the desired output, $S(t)$. As before, inverse transform converter 24′ is employed to produce samples for an enhanced continuous analog replica of the original input. Since these samples are digital in form, they are applied to D to A converter 26′ from which an enhanced output is secured.

In operation, the $\hat{S}(t)$ is cyclically generated at the same repetition rate as the desired signal, but the phase thereof relative to the desired signal is adjustable so that it may be made to correspond in time with repetitions of the desired signal as received.

A further system according to the present invention is illustrated in FIG. 4 and comprises a feedback control system. In the classical system, a portion of the output is subtracted from the input and the result is used to drive the system. The conventional system thus seeks a null condition. In the present system, a reciprocal of the output is obtained and multiplied with the input to obtain the driving signal. Thus, the system seeks a constant. In FIG. 4, reference signal generator 12 suitably comprises an oscillator or other signal source having a frequency which is to be determinative in this case of the speed of operation of DC motor 36. In a particular instance, signal generator 12 was an oscillator producing a sinusoidal signal which was sampled at the rate of eight samples per cycle at the input of analog to digital converter 38. A to D converter 38 digitizes the samples and provides the input for Walsh transform converter 40 wherein Walsh coefficients are generated for Walsh functions which together represent the reference signal.

A tachometer 42 comprising an alternator is driven by the shaft of motor 36 and supplies an AC output to analog to digital converter 44 wherein the output of tachometer 42 is sampled at a rate suitably the same as that accomplished by A to D converter 38. Here again the samples are digitized and coupled to a Walsh tranform converter 46 which generates coefficients of Walsh functions representing the tachometer output. The array of coefficients is coupled to reciprocal Walsh function converter 48 wherein coefficients are produced for a series of Walsh functions which would comprise the reciprocal of the series represented from converter 46, and the output of converter 48 is multiplied by means of dyadic addition in multiplier 50 with the output of converter 40. The output of multiplier 50 will be unity providing the outputs of converters 40 and 48 are the same, indicative of motor operation at the desired speed. So long as the output frequency of the reference signal generator 12 remains constant, the motor speed remains constant. A change in output speed or input signal results in a change in drive signal to restore the system to equilibrium. The change in drive signal is rather large.

The output of multiplier 50 is applied to digital to analog converter 52 which may also include an inverse Walsh transform converter. However, since the output sought from multiplier is unity, the circuitry in element 52 may be simplified and may comprise a summing amplifier receiving the Walsh coefficient outputs from multiplier 50. The converter 52 drives amplifier device 54 which contains circuitry for supplying current to field winding 56 associated with motor 36. The current is changed in the field winding in a direction for restoring system equilibrium.

Figure 5:
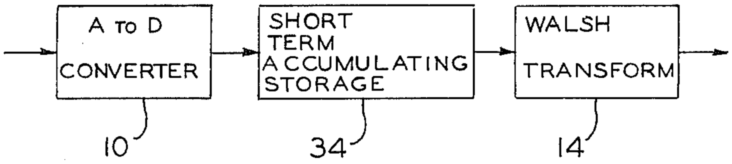
FIG. 5 is a block diagram illustrating a portion of the aforesaid systems in greater detail for providing Walsh function coefficient outputs.

Considering FIG. 5, a more detailed description will be given relative to the means for changing input signal into a representation comprising the coefficients of a series of Walsh functions. Input signals are sampled and the samples are converted to digital values in A to D converter 10. These digitized samples for a given interval are stored in the short term accumulating storage array 34, which may be considered a part of either A to D converter 10 or Walsh transform converter 14. The size of the storage array depends on the number of coefficients to be resolved, and also the size of the Walsh transform converter array will depend upon the number of coefficients desired. In converter 14 the transformation is produced by means of the Hadamard matrix, the matrix multiplication being more fully illustrated in the circuit of FIG. 6.

Referring to FIG. 6, control unit 36 causes the A to D converter 10 to sample at appropriate times, and consecutive samples are consecutively stored in the storage array 34 having registers numbered one, two, three and four. Although the illustrative circuit stores four samples per cycle, it will be understood that this number is by way of example only and a greater number can be employed for greater accuracy.

As soon as the four digital values are stored by storage array 34, the outputs of the individual registers are coupled to the Walsh transform converter 14 which here comprises a group of four dual adders that can perform full carry addition and subtraction. In first level adders 38 and 40, the sums and differences of 1 and 2, and of 3 and 4 are formed, wherein the numbers correspond to samples from similarly numbered registers in array 34. The partial results are coupled to the second level adders 42 and 44 where indicated sums and differences are again formed. The outputs of the second level adders are Walsh series coefficients of the input signal. Thus, the coefficient of Walsh function $W_0$, i.e. $\alpha_0$, equals (1+2+3+4), the coefficient of Walsh function $W_1$, i.e. $\alpha_1$, equals (1+2−3−4), the coefficient for Walsh function $W_2$, i.e. $\alpha_2$, equals (1−2+3−4), and the coefficient of the Walsh function $W_3$, i.e. $\alpha_3$, equals (1−2−3+4). The Hadamard matrix utilized by this particular four sample circuit will be seen to be as follows:

$$\left[\begin{array}{cc|cc} 1 & 1 & 1 & 1 \\ 1 & -1 & 1 & -1 \\ \hline 1 & 1 & -1 & -1 \\ 1 & -1 & -1 & 1 \end{array}\right]$$

Figure 7:
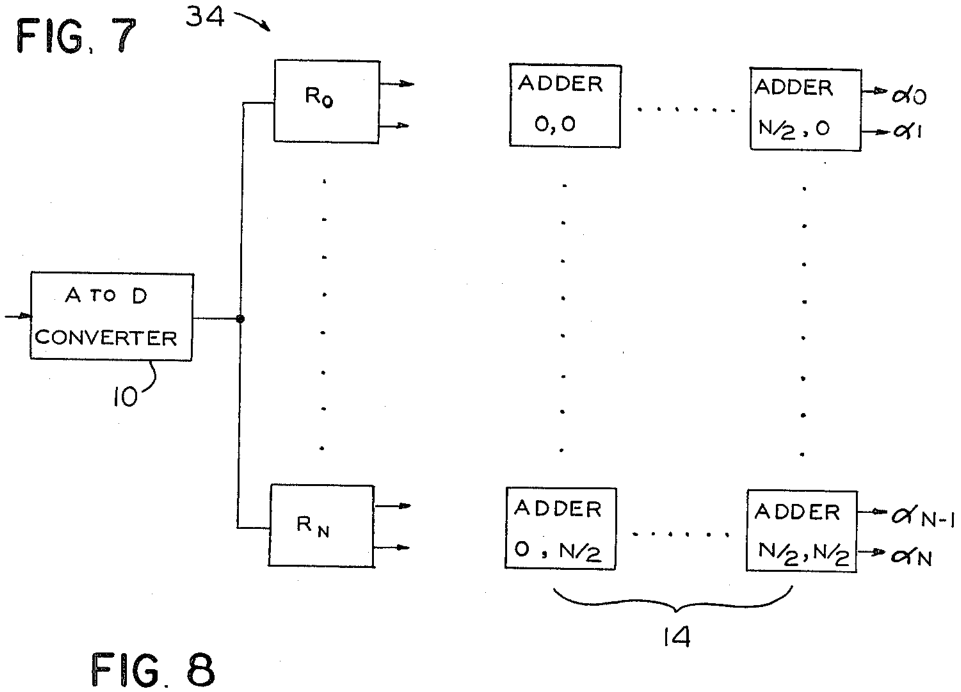
FIG. 7 is a block diagram of a generalized version of the FIG. 6 apparatus for greater than four samples.

The circuit is extended to larger arrays as illustrated in FIG. 7. In FIG. 7, storage array 34 comprises registers $R_0$ through $R_N$, and Walsh transform converter 14 comprises an array of dual adders comprising Adder 0,0 through Adder $N/2N/2$. For sixteen input signal samples, sixteen registers are required for array 34, and an 8 by 8 array of dual adders for Walsh transform converter 14 for Hadamard transformation as will be understood by those skilled in the art. In the FIG. 7 circuit it is understood that a control unit will be employed to bring about operation of A to D converter 10 in the manner hereinbefore described, storage of digitized samples in array 34, and successive adding operations by the levels of adders from left to right in converter 14. Output identified $\alpha_0$ through $\alpha_N$ in FIG. 7 comprises the coefficients for the Walsh functions $W_0$ through $W_N$ in the Walsh series into which the input is being converted.

It is understood that the circuit of FIG. 6 or the circuit of FIG. 7 may be employed to provide Walsh transform coefficients in the hereinbefore described embodiments. However, the four-coefficient output of the FIG. 6 circuit will be referenced in the following discussion of circuitry.

Figure 9:
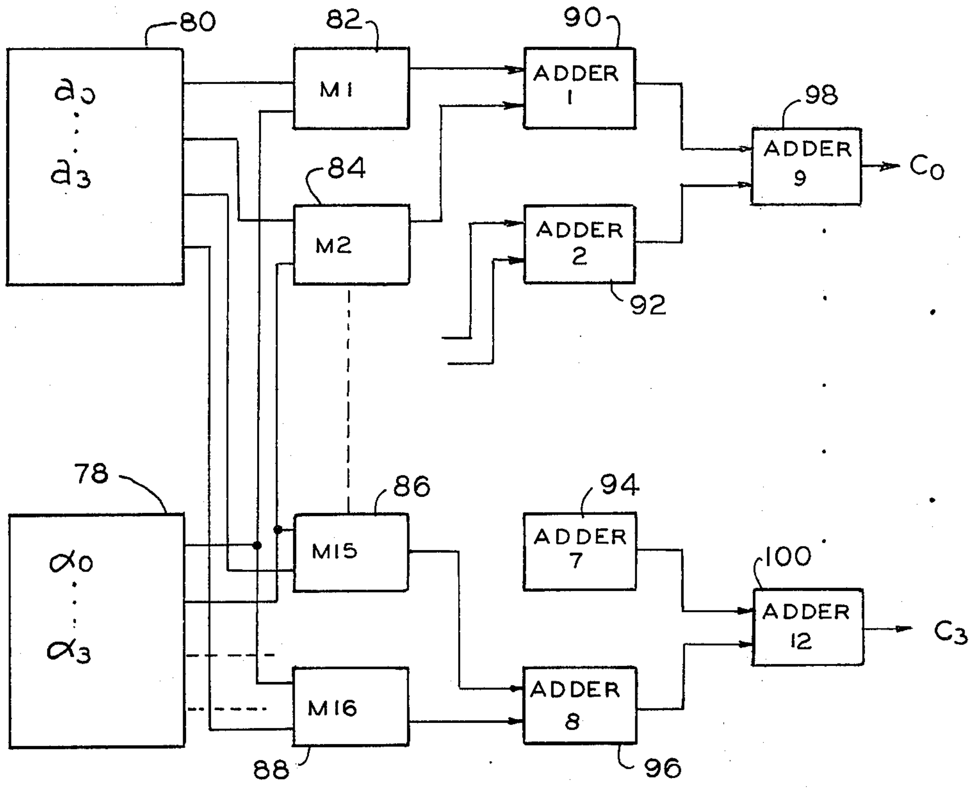
FIG. 9 is a block diagram of a multiplier circuit as employed according to the present invention.

Referring to FIG. 9, a circuit is illustrated for implementing the multipliers indicated at 22, 22′, 32 and 50 in FIGS. 2 through 4. For the sake of identifying inputs and outputs in the following description, the FIG. 9 circuit will be considered as implementing the multiplier numbered 22 in the FIG. 1 embodiment. A series of Walsh function coefficients $\alpha_0 \ldots \alpha_3$ from Walsh transform converter 14 is stored in register 78 in FIG. 9 for multiplication with a series of Walsh function coefficients provided by reciprocal Walsh transform converter 20. The latter series of coefficients is designated $a_0 \ldots a_3$ and is stored in register 80.

Selected of the coefficient values from registers 78 and 80 will be provided to a bank of 16 multipliers, M1...M16, four of which are illustrated at 82, 84, 86 and 88 in FIG. 9. The bank of multipliers provides inputs to a first level of eight adders, four of which are illustrated at 90, 92, 94 and 96. In turn, the first level adders drive a second level of four adders represented by the adders designated 98 and 100. The product output produced comprises an array of four coefficients, $C_0$, $C_1$, $C_2$ and $C_3$, wherein each of these coefficients is generated by one of the second level adders. The multipliers M1...M16, the first level adders and the second level adders are successively actuated during a given cycle for producing these product coefficients. The particular manner of interconnection of these elements in the FIG. 9 circuit will become more apparent from the following discussion.

According to Theorem 1, the product $$\sum_{i=0}^{M} a_j W_i \sum_{j=0}^{N} \alpha_j W_j = \sum_{i=0}^{M} \sum_{j=0}^{N} a_i \alpha_j W_{i \oplus j}$$

Let $l = i \oplus j$, then $j = i \oplus l$,
and $$\sum_{i=0}^{M} a_i W_i \sum_{j=0}^{N} \alpha_j W_j = \sum_{l=0}^{\max(i \oplus j)} W_l \sum_{i=0}^{N} a_i \alpha_{i \oplus l}$$

For $M=3$, $N=3$, $max\ (i \oplus j)=3$, $$\sum_{i=0}^{M} a_i W_i \sum_{j=0}^{N} \alpha_i W_j = \sum_{l=0}^{3} W_l \sum_{i=0}^{3} a_i \alpha_{i \oplus l}.$$

Therefore, each Walsh function $W_l$ in the product has a coefficient which we may indicate $C_l =$ $$\sum_{i=0}^{3} a_i \alpha_{i \oplus l}$$

$$C_0 = \sum_{i=0}^{3} a_i \alpha_{i \oplus 0} = a_0\alpha_0 + a_1\alpha_1 + a_2\alpha_2 + a_3\alpha_3$$

$$C_1 = \sum_{i=0}^{3} a_i \alpha_{i \oplus 1} = a_0\alpha_1 + a_1\alpha_0 + a_2\alpha_3 + a_3\alpha_2$$

$$C_2 = \sum_{i=0}^{3} a_i \alpha_{i \oplus 2} = a_0\alpha_2 + a_1\alpha_3 + a_2\alpha_0 + a_3\alpha_1$$

$$C_3 = \sum_{i=0}^{3} a_i \alpha_{i \oplus 3} = a_0\alpha_3 + a_1\alpha_2 + a_2\alpha_1 + a_3\alpha_0$$

Referring again to FIG. 9, multiplier 82 is employed to multiply the coefficients $a_0$ and $\alpha_0$, while multiplier 84 multiplies the coefficients $a_1$ and $\alpha_1$. Adder 90 provides the sum of these two multiplications, while adder 92 is employed in a similar manner for summing the products $a_2\alpha_2$ and $a_3\alpha_3$. Adder 98 then provides the complete sum which is equal to $C_0$.

Multiplier 86 in FIG. 9 provides the product $a_2\alpha_1$, while multiplier 88 multiplies $a_3$ and $\alpha_0$. These two products, which are seen to be the last two terms in the solution for $C_3$, are added in adder 96. Adder 100 receives as one input thereof the sum output from adder 96 and as the other input thereof the sum output from adder 94 comprising the addition of the remaining terms in $C_3$. Thus, adder 100 provides the final total equaling $C_3$. The remaining indicated elements of the FIG. 9 circuit perform the successive multiplications and additions specified by the foregoing expressions for $C_0 \ldots C_3$ in a straightforward manner following the illustrated pattern.

Figure 8:
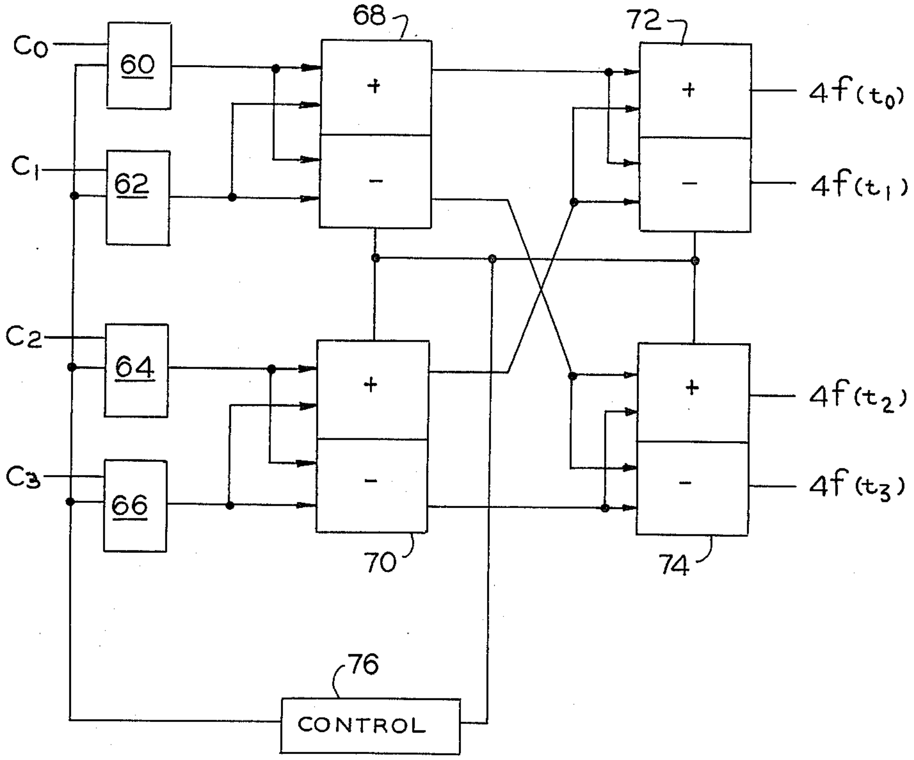
FIG. 8 is a block diagram of an inverse Walsh tranform converter utilized in systems of the present invention.

A circuit for inverse Walsh transform converter 24 (or 24′) is illustrated in FIG. 8. The product coefficients, $C_0$, $C_1$, $C_2$ and $C_3$, are stored respectively in registers 60, 62, 64 and 66. The first level adders 68 and 70 form the quantities $C_0+C_1$, $C_0-C_1$, $C_2+C_3$ and $C_2-C_3$. The second level adders 42 and 44 form the quantities $C_0+C_1+C_2+C_3=4f(t_0)$, $C_0+C_1-C_2-C_3=4f(t_1)$, $C_0-C_1+C_2-C_3=4f(t_2)$ and $C_0-C_1-C_2+C_3=4f(t_3)$. Operation of the registers for storing, operation of the first level adders, and operation of the second level adders in sequential order are controlled by unit 76. It will be seen that the inverse transformation takes place in substantially the same manner as the original forward Walsh transformation as illustrated, for example, according to the FIG. 6 circuit. The outputs from second level adders 72 and 74 are larger than the required output values by a scale factor of 4, but this scale factor can be taken into consideration in the digital to analog converter 26 (or 26′) which receives digital outputs $4f(t_0)$, $4f(t_1)$, $4f(t_2)$ and $4f(t_3)$ for conversion into continuous analog form.

Figure 10:
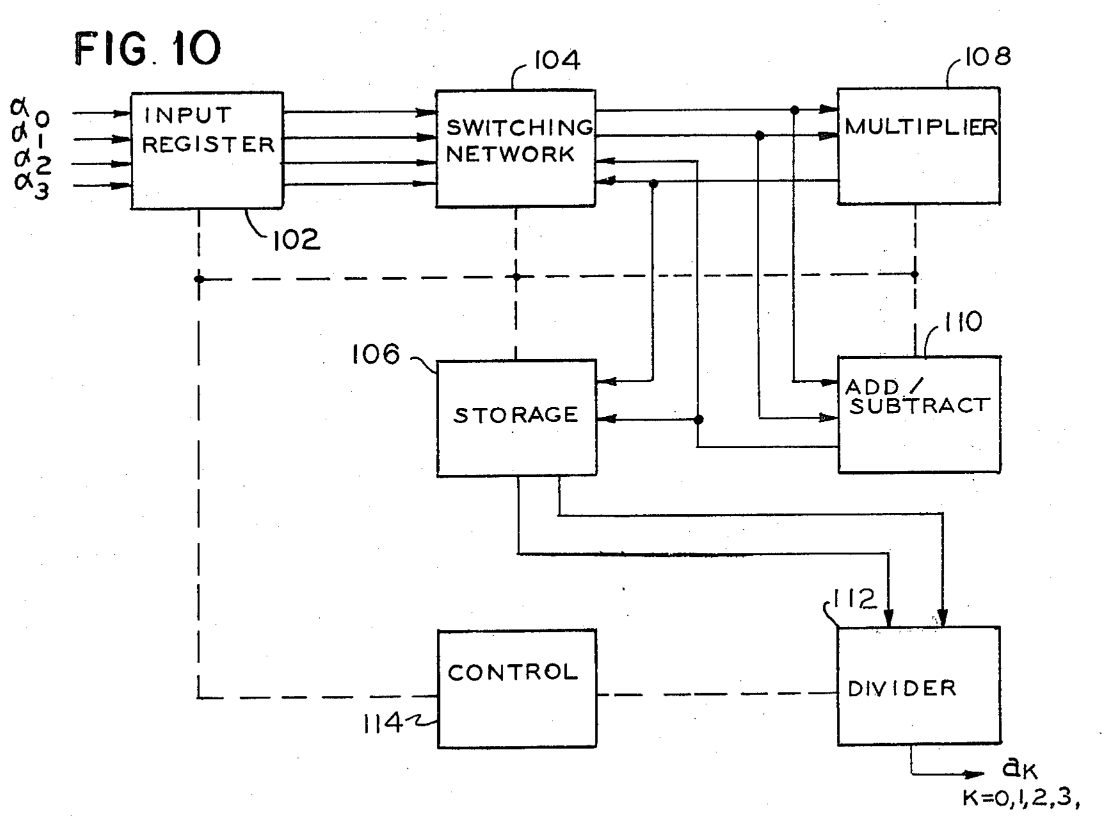
FIG. 10 is a block diagram of a reciprocal Walsh transform converter employed according to the present invention.

FIG. 10 illustrates circuitry for the reciprocal Walsh transform converter 20, 20′, or 48. Particularly considering the FIG. 1 embodiment, Walsh transform converter 18 produces an additional set of Walsh function coefficients $\alpha_0$, $\alpha_1$, $\alpha_2$, $\alpha_3$ in the manner exemplified by the FIG. 6 circuit. For a given cycle of operation, these four coefficients are separately stored in an input register 102 where they are available to the remainder of the FIG. 10 circuit via the switching network 104 operated under the control of control switching network 104 operated under the control of control unit 114. Successive multiplications, additions, subtractions and divisions are performed as hereinafter described employing multiplier 108, adder/subtractor 110 and divider 112, with intermediate results being held in storage unit 106.

As hereinbefore described, the coefficients, $a_k$, of a reciprocal series are obtained by simultaneous solution of equations defined by (4). In the case of the particular four term example, the four equations are given by expression (8):

$$\sum_{k=0}^{3} a_k \alpha_{k \oplus l} = \delta_{l,0}\ ,\ l = 0,1,2,3.$$

Employing Cramer's rule to solve the equations as indicated by expression (9), $a_k = 1/\Delta$ Cofactor $(k,1)$. In the example, $\Delta =$ $$\begin{vmatrix} \alpha_0 & \alpha_1 & \alpha_2 & \alpha_3 \\ \alpha_1 & \alpha_0 & \alpha_3 & \alpha_2 \\ \alpha_2 & \alpha_3 & \alpha_0 & \alpha_1 \\ \alpha_3 & \alpha_2 & \alpha_1 & \alpha_0 \end{vmatrix}$$

Also, $\Delta$ can be expressed as $$\sum_{k=0}^{3} \alpha_k \text{ Cofactor } (k,1) \qquad (11)$$

Cofactor $(k;1) =$ $$\alpha_k^3 + 2 \prod_{i \neq k}^{3} \alpha_i - \alpha_k \sum_{i \neq k}^{3} \alpha_i^2,\ k = 0,1,2,3 \qquad (12)$$

where $\pi$ indicates product. If $k$=0, the Cofactor $(k,1) =$ $$\begin{vmatrix} \alpha_0 & \alpha_3 & \alpha_2 \\ \alpha_3 & \alpha_0 & \alpha_1 \\ \alpha_2 & \alpha_1 & \alpha_0 \end{vmatrix}$$

$$= \alpha_0^3 + 2\alpha_1\alpha_2\alpha_3 - \alpha_0(\alpha_1^2+\alpha_2^2+\alpha_3^2) \qquad (13)$$

$$\text{Then, } a_0 = \frac{\alpha_0^3+2\alpha_1\alpha_2\alpha_3 - \alpha_0(\alpha_1^2+\alpha_2^2+\alpha_3^2)}{\sum_{k=0}^{3} \alpha_k \text{ Cofactor (k,1)}} \qquad (14)$$

For the solution to the other coefficients, $a_1$, $a_2$ and $a_3$, the numerator of expression (14) is changed according to expression (12) for the particular $k$.

Returning to FIG. 10, the circuit solves for the $\{a_k\}$ in the manner just described. The circuit first solves for and outputs the value of $a_0$ by implementing equation (14). As indicated above, the numerator of expression (14) is the Cofactor for $k$=0, as given by expression (12). The following operations are consecutively performed by the FIG. 10 circuit under the control of control unit 114:

a. Switching network 104 places the $\alpha_0$ value from register 102 on both output lines of network 104 leading to multiplier 108, multiplier 108 is operated by control unit 114, and the result, $\alpha_0^2$, is coupled to temporary storage unit 106 by the switching network.

b. The values of $\alpha_1^2$, $\alpha_2^2$ and $\alpha_3^2$ are similarly obtained and stored in unit 106.

c. The switching network couples $\alpha_0^2$ from storage unit 106 to one input lead of multiplier 108 while the value of $\alpha_0$ from register 102 is coupled to the other multiplier input lead and the multiplier is operated to provide the value of $\alpha_0^3$. The latter is stored in storage unit 106. As will be noted, the values of $\alpha_1^3$, $\alpha_2^3$ and $\alpha_3^3$ can be obtained and stored in a similar manner.

d. The values $\alpha_2^2$ and $\alpha_3^2$ are directed by switching network 104 from storage unit 106 to adder/subtractor 110 where the sum $\alpha_2^2+\alpha_3^2$ is formed under the control of control unit 114 and rerouted by the switching network to storage unit 106. Then switching network 104 routes the sum, $\alpha_2^2+\alpha_3^2$, and $\alpha_1^2$ from storage unit 106, to adder/subtractor 110 where the sum of the three is obtained for return to storage unit 106.

e. The sum, $\alpha_1^2+\alpha_2^2+\alpha_3^2$ from register 106, is routed by the switching network to multiplier 108 via one input lead thereof, while $\alpha_0$ is routed on the other input lead and the multiplier is operated by the control unit to provide the product $\alpha_0(\alpha_1^2+\alpha_2^2+\alpha_3^2)$ for storage in storage unit 106.

f. The results from step ($e$) and the value of $\alpha_0^3$ from storage unit 106 are routed by the switching network to adder/subtractor 110 where a subtraction is performed yielding $\alpha_0^3-\alpha_0(\alpha_1^2+\alpha_2^2+\alpha_3^2)$ for re-entry into storage unit 106.

g. The switching network directs $\alpha_2$ and $\alpha_3$ to multiplier 108 where the product is obtained for storage in storage unit 106. Then this result iis redirected to multiplier 108 in conjunction with $\alpha_1$ for multiplication. The latter product is left-shifted by one binary bit to provide $2\alpha_1\alpha_2\alpha_3$ which is returned to storage unit 106.

h. The results of step ($f$) and step ($g$) are directed by the switching network to adder/subtractor 110, where the sum is formed for storage in unit 106. This sum comprises the numerator of expression (14), i.e. the Cofactor as defined by expression (13).

i. The above steps are repeated, so far as intermediate values therefor are not already stored in storage unit 106, for the other three Cofactors as defined by expression (12) for $k$=1,2,3, and the results are also stored in storage unit 106.

j. The values of $\alpha_0$, $\alpha_1$, $\alpha_2$ and $\alpha_3$ are consecutively directed by switching network 104 to multiplier 108 while at the same time corresponding Cofactors from storage unit 106 are consecutively provided as the other input to multiplier 108. The multiplier is actuated for consecutively supplying the products $\alpha_k$ Cofactor $(k,1)$ for $k$=0,1,2,3. These products are stored in storage unit 106.

k. The four results of step ($j$) are added together. Since four terms are involved, a first pair and then a second pair are coupled from storage unit 106 to adder/ subtractor 110 for addition, after which the sums are stored in unit 106. The sums of the pairs are then inputted from the storage unit to the adder/subtractor where they are added together to provide the denominator of expression (14), i.e. $\Delta$ as defined by expression (11). The resultant is stored in storage unit 106.

l. The result of step ($h$) is routed by the control unit from storage unit 106 to divider 112, while the result of step ($k$) is similarly directed to divider 112 where the former is divided by the latter to provide the solution for $a_0$ according to equation (14). This digital value is outputted to register 80 in FIG. 9.

m. The values of the Cofactors obtained in step ($j$) are also consecutively divided by $\Delta$ in divider 112 and the digital outputs produced are likewise coupled to register 80 in FIG. 9. This completes generation of the array of coefficients representative of the reciprocal series desired.

It should be noted the foregoing operations as performed by the various components of the FIG. 10 circuit are controlled or timed by control unit 114 via a plurality of interconnecting means generally represented in dashed line. Such interconnection from the control for bringing about the successive arithmetic operations above described is well within the understanding of those skilled in the art. The control unit may sequence the operations (*a*) through (*j*) by means of either hard-wired sequencing circuitry, and/or by means of stored software, in a conventional manner with regard to the FIG. 10 computing circuitry.

Figure 11:
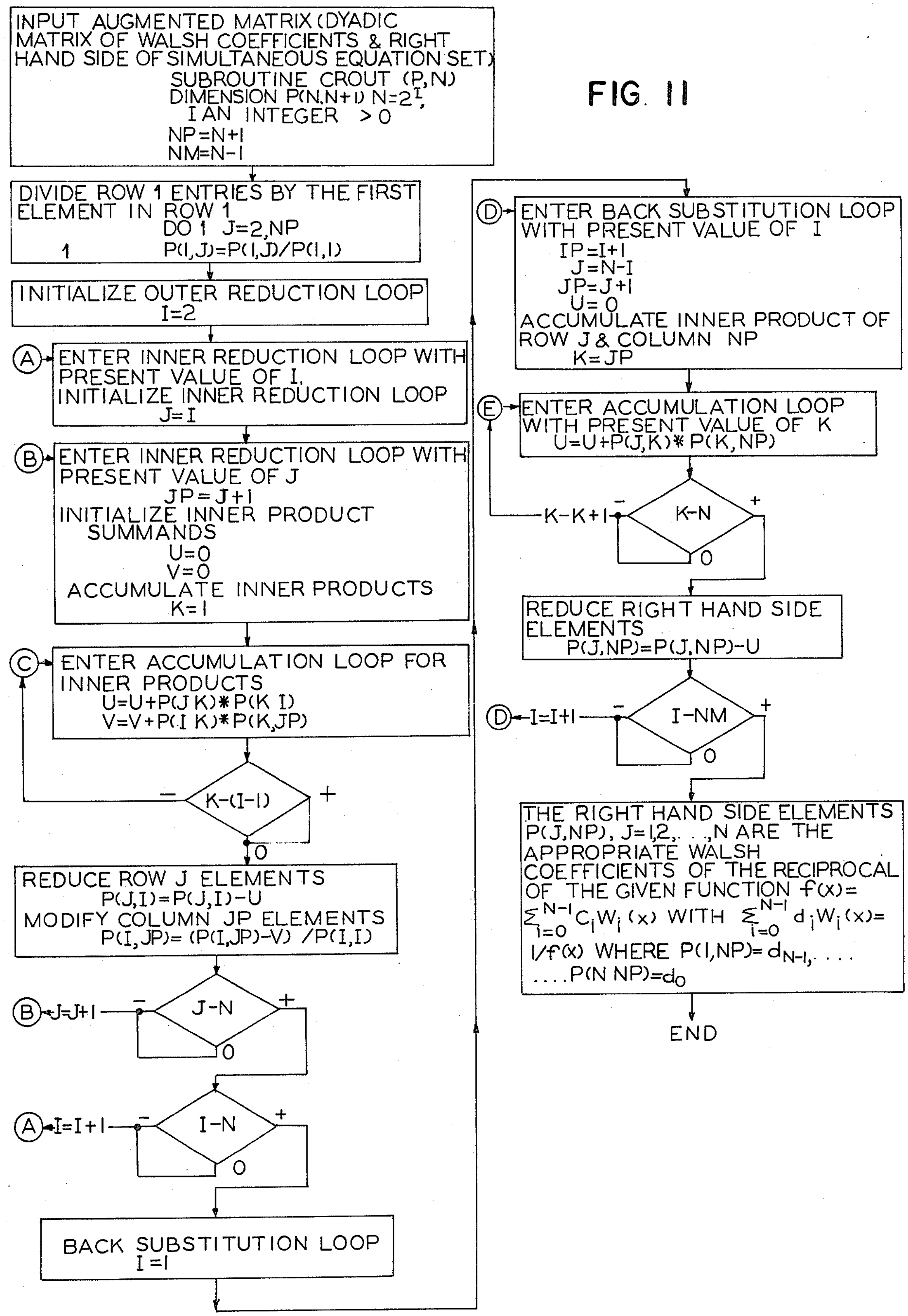
FIG. 11 is a flow diagram of a program routine which alternatively may be employed according to the present invention, for solving simultaneous equations.

The particular means as described with reference to FIG. 10 for solving simultaneous equations to provide coefficients of the reciprocal series are illustrated by way of example and can be employed when a relatively small number of equations and unknowns are involved. A more complex implementation as hereinafter described is alternatively suitable particularly when solving for a greater number of terms. For example, general purpose digital computing apparatus may be employed at the location of circuit elements 20, 20' or 48 for cyclically solving sets of simultaneous equations identified by expression (4) utilizing the routine illustrated in the FIG. 11 flow diagram. This routine, which is here expressed employing Fortran IV terminology, is entitled "Crout" and is well known to those skilled in the art. Consideration of the manner in which the Crout reduction operates to solve simultaneous equations can be found in "Introduction to Numerical Analysis" by F. B. Hildebrand, McGraw-Hill, 1956, p. 429 et seq. and p. 486 et seq. Examples of computing apparatus for carrying out the Crout routine are the IBM 360/65 manufactured by International Business Machines, Armonk, New York, the CDC 6400 manufactured by Control Data Corp., Minneapolis, Minnesota, and the DEC PDP 11 manufactured by Digital Equipment Corp., Maynard, Massachusetts. The Crout routine is set forth herein by way of example, and various other programs for solving the simultaneous equations defined by expression (4) may be substituted therefor.

It will also be appreciated that any or all of the various digital functions performed by the transform converter, inverse transform converter, reciprocal transform converter, multipliers, storage devices and control means as hereinbefore described can likewise be implemented employing general or special purpose digital computers. The programming of general or special purpose computer apparatus to carry out the various functions of addition, subtraction, multiplication, division and control, as disclosed with reference to FIGS. 6 through 10, is straightforward, and any of the above mentioned general purpose computers may be employed in this way if desired. In such case, the computer elements perform in essentially the same manner or in an equivalent manner to the circuitry hereinbefore disclosed.

In the foregoing specification, the term "square wave" is meant to indicate a periodic wave that alternately assumes one of two relatively fixed values. It is not meant to imply that each square wave half cycle will have the same duration, or that there exists a constant ratio between duration and magnitude of square wave half cycles. Furthermore, the transformation of a function or signal into square wave component representation includes representation by the values thereof, e.g. digital values indicative of the magnitude of such square wave components.

In the foregoing circuits, an input signal or value may in some cases be considered unity, i.e. in the case of multiplication with another input signal or value. For instance, for some purposes it may be desired to obtain a reciprocal Walsh series representation without further multiplication.

While we have shown and described various embodiments of our invention, it will be apparent to those skilled in the art that many other changes and modifications may be made without departing from our invention in its broader aspects. We, therefore, intend the appended claims to cover all such changes and modifications as fall within the true spirit and scope of our invention.

We claim:

1. Apparatus for combining a pair of inputs, said apparatus including means for representing each input as a series expansion of square wave components, means for generating the reciprocal of one said series expansion of square wave components as a third series of square wave components, and means for combining said third series of square wave components with the remaining series expansion of square wave components to provide an output.

2. The apparatus according to claim 1 wherein said pair of inputs comprise input waveforms, said apparatus including means for deriving samples of said input waveforms for presentation of said samples to said means for representing each input as a series expansion of square wave components.

3. The apparatus according to claim 1 including means for inversely transforming said output to provide resultant values, and means for converting the resultant values into a substantially continuous waveform.

4. The apparatus according to claim 1 wherein said means for combining said third series of square wave components with the remaining series expansion of square wave components comprises multiplier means.

5. The apparatus according to claim 1 wherein said pair of inputs comprise input waveforms, said apparatus including means for sampling said input waveforms and means for converting said samples to digital values prior to presentation to said means for representing said samples as a series expansion of square wave components, said means for combining said third series of square wave components with the remaining series expansion of square wave components comprising multiplier means.

6. Filtering apparatus comprising:

means for transforming an input waveform into a first series expansion of square wave components, means for transforming a signal factor into a second series expansion of square wave components, means for generating the reciprocal of the second series expansion of square wave components as a third series of square wave components, means for multiplying said first series expansion of square wave components by said third series expansion of square wave components to provide a fourth series of square wave components, means for inversely transforming said fourth series of square wave components to provide resultant values, and means for converting the resultant values into a substantially continuous signal output representative of the input waveform having said factor divided therefrom.

7. The apparatus according to claim 6 further including a system to be controlled and means for generating feedback in response to system operation for providing said signal factor, and means responsive to said output for generating a restoring signal in said system.

8. Apparatus for signal enhancement comprising:

means for receiving a first input signal, means for transforming said first signal into a first series expansion of square wave components, means for providing a model of said input signal without noise, means for transforming said model into a second series expansion of square wave components, means for generating the reciprocal of the second series expansion of square wave components to provide a third series of square wave components, means for multiplying the first and third series of square wave components to provide a fourth series of square wave components, means for generating the reciprocal of the fourth series of square wave components to provide a fifth series of square wave components, means for multiplying the fifth series of square wave components with said first series of square wave components to provide a sixth series of square wave components, means for inversely transforming said sixth series of square wave components to provide resultant values, and means for converting the resultant values into a substantially continuous signal.

9. Information transferring circuitry comprising:

means for spectrally decomposing at least a portion of an input signal function into a series expansion of Walsh function representations, and transforming means for converting said series expansion into a reciprocal series expansion, said transforming means comprising computing means for simultaneously solving a set of equations for the coefficients $a_k$ of the reciprocal series expansion, wherein the $l$th equation comprises the summation from k=0 to $2^p-1$ of coefficients $a_k\alpha_{k\oplus l}$ equaling $\delta_{l,0}$, in which $\alpha_{k\oplus l}$ identifies the cofficients of the first mentioned series expansion, $l$ equals 0,1,2 ...$2^p-1$, $p$ is an integer, and $\delta_{l,0}$ is 1 if $l=0$ and 0 if $l \neq 0$.

10. The circuitry according to claim 9 including means for inversely transforming said reciprocal series expansion into samples of a second function.

11. The circuitry according to claim 9 wherein said means for spectrally decomposing comprises means for sampling the input function and means to combine said samples to transform the same into said Walsh function representations.

12. The circuitry according to claim 9 further including means for spectrally decomposing at least a portion of a second input function into a second series expansion of Walsh function representations, and multiplying means for multiplying said second series expansion of Walsh function representations by said reciprocal series expansion.

13. Apparatus for signal enhancement comprising:

means for developing a Walsh function representation for a segment of signal input, means for developing a Walsh function representation for a signal factor to be removed from said signal, means for generating the reciprocal of one of said Walsh function representations, and means for combining the said reciprocal with the other of said Walsh function representations.

14. The apparatus according to claim 13 wherein said means for generating the reciprocal comprises means for solving a set of simultaneous equations for coefficients $a_k$ of the reciprocal series wherein such set of equations is defined by multiplication of the proposed reciprocal Walsh series $$\sum_{k=0}^{M} a_k W_k(x)$$

by the terms of the Walsh series $$\sum_{j=0}^{N} \alpha_j W_j(x)$$

for which the reciprocal is desired, the coefficients of the last mentioned series being $\alpha_j$.

15. The apparatus according to claim 13 wherein said means for developing the reciprocal comprises means for solving a set of simultaneous equations for coefficients of the reciprocal series, said equations having the form $$\sum_{k=0}^{2^p-1} a_k\alpha_{k\oplus l} = \delta_{l,0};\ l = 0,1,2,\ldots,2^p-1$$

wherein the $\{a_k\}$ are representative of coefficients of the reciprocal Walsh series to be determined, the $\{\alpha_{k\oplus l}\}$ are representative of the coefficients of the given Walsh series for which the reciprocal is desired, $p$ is an integer and $\delta_{l,0}$ is 1 if $l=0$ and 0 if $l \neq 0$.

16. Apparatus for providing the reciprocal of an input signal comprising:

means for transforming said signal into a first series expansion of square wave components, means for generating the reciprocal of said series expansion of square wave components including means for solving equations for coefficients of a reciprocal series, said equations having the form $$\sum_{k=0}^{2^p-1} a_k\alpha_{k\oplus l} = \delta_{l,0};\ l = 0,1,2,\ldots,2^p-1$$

wherein the $\{a_k\}$ are representative of coefficients of the reciprocal Walsh series to be determined, the $\{\alpha_{k\oplus l}\}$ are representative of the coefficients of the given Walsh series for which the reciprocal is desired, $p$ an integer and $\delta_{l,0}$ is 1 if $l=0$ and 0 if $l \neq 0$, and means for inversely transforming the said coefficients of said reciprocal series to provide samples of the desired continuous signal comprising the reciprocal of said input signal.

17. Apparatus for signal enhancement comprising:

means for receiving an input signal and transforming the same by spectral decomposition into a series of square wavecomponents, and means for combining the first mentioned series of square wave components with another series of square wave components representative of undesired factors for enhancing the input signal, including generating the reciprocal Walsh series of one said series of square wave components.

18. System control apparatus comprising:

means for producing a control function and for converting said control function into a square wave spectral decomposition, means for converting a system operating function to provide a second square wave spectral decomposition, means for generating the reciprocal series of one of the aforesaid spectral decompositions, means for multiplying the reciprocal series with the second spectral decomposition to yield a third series, and means to convert said third series into a signal to provide a restoring force in said system.

* * * * *

UNITED STATES PATENT AND TRADEMARK OFFICE

CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below:

Column 1, line 16, "preferably" should be --preferable--.
Column 2, line 20, "in", first occurrence, should be --is--.

Column 3, line 15, "$m/2^{k+}<x \leq (m+1)/2^{k+1}$" should be --$m/2^{k+1} < x \leq (m+1)/2^{k+1}$--.

Column 3, line 16, "$m=0,1,2,\ldots,2^k - 1$" should be --$m = 0,1,2,\ldots,2^{k+1} - 1$--.

Column 3, line 28, "$W_n(x) = \underset{k=0}{II} \times [R_k(x)]^{n_k}$" should be --$W_n(x) = \prod_{k=0}^{\infty} [R_k(x)]^{n_k}$--.

Column 3, line 31, "$n = \sum_{k=0}^{\times} n_k 2^k,\ n_k \varepsilon \{0,1\}$" should be --$n = \sum_{k=0}^{\infty} n_k 2^k,\ n_k \varepsilon \{0,1\}$--.

Column 4, line 4, "♀" should be --(♀)--.

Column 4, line 10, "$m = \sum_{k=0}^{\times} m_k 2^k$ ," should be --$m = \sum_{k=0}^{\infty} m_k 2^k$ ,--.

Column 4, line 13, "$n = \sum_{K=0}^{\times} n_k 2^k$ ," should be --$n = \sum_{k=0}^{\infty} n_k 2^k$ ,--.

UNITED STATES PATENT OFFICE
CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below:

Column 4, line 16, "$m ♀ n = \sum_{k=0}^{\times} (m_k ♀ n_k)\ 2^k$ ," should be

--$m ♀ n = \sum_{k=0}^{\infty} (m_k ♀ n_k)\ 2^k$ ,--.

Column 4, line 26, "7 ♀ 12 = 11" should be --7♀12=11--.

Column 4, line 36, "A ♀ B = C then A = B ♀ C and B = A ♀ C" should be --A ♀ B = C then A = B ♀ C and B = A ♀ C--.

Column 4, line 38, "7 ♀ 12= 11, but 12 ♀ 11 = 7, and 7 ♀ 12" should be --7 ♀ 12 = 11, but 12 ♀ 11 = 7, and 7 ♀ 11 = 12--.

UNITED STATES PATENT OFFICE
CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below: Columns 3 and 4, lines 40-56

"Table I

Dyadic Addition

| ♀ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 1 | 0 | 3 | 2 | 5 | 4 | 7 | 6 | 9 | 8 | 11 | 10 | 13 | 12 | 15 | 14 |
| 2 | 2 | 3 | 0 | 1 | 6 | 7 | 4 | 5 | 10 | 11 | 8 | 9 | 14 | 15 | 12 | 13 |
| 3 | 3 | 2 | 1 | 0 | 7 | 6 | 5 | 4 | 11 | 10 | 9 | 8 | 15 | 14 | 13 | 12 |
| 4 | 4 | 5 | 6 | 7 | 0 | 1 | 2 | 3 | 12 | 13 | 14 | 15 | 8 | 9 | 10 | 11 |
| 5 | 5 | 4 | 7 | 6 | 1 | 0 | 3 | 2 | 13 | 12 | 15 | 14 | 9 | 8 | 11 | 10 |
| 6 | 6 | 7 | 4 | 5 | 2 | 3 | 0 | 1 | 14 | 15 | 12 | 13 | 10 | 11 | 8 | 9 |
| 7 | 7 | 6 | 5 | 4 | 3 | 2 | 1 | 0 | 15 | 14 | 13 | 12 | 11 | 10 | 9 | 8 |
| 8 | 8 | 9 | 10 | 11 | 12 | 13 | 14 | 15 | 0 | 1 | 2 | 3 | 4 | 5 | 6 | 7 |
| 9 | 9 | 8 | 11 | 10 | 13 | 12 | 15 | 14 | 1 | 0 | 3 | 2 | 5 | 4 | 7 | 6 |
| 10 | 10 | 11 | 8 | 9 | 14 | 15 | 12 | 13 | 2 | 3 | 0 | 1 | 6 | 7 | 4 | 5 |
| 11 | 11 | 10 | 9 | 8 | 15 | 14 | 13 | 12 | 3 | 2 | 1 | 0 | 7 | 6 | 5 | 4 |
| 12 | 12 | 13 | 14 | 15 | 8 | 9 | 10 | 11 | 4 | 5 | 6 | 7 | 0 | 1 | 2 | 3 |
| 13 | 13 | 12 | 15 | 14 | 9 | 8 | 11 | 10 | 5 | 4 | 7 | 6 | 1 | 0 | 3 | 2 |
| 14 | 14 | 15 | 12 | 13 | 10 | 11 | 8 | 9 | 6 | 7 | 4 | 5 | 2 | 3 | 0 | 1 |
| 15 | 15 | 14 | 13 | 12 | 11 | 10 | 9 | 8 | 7 | 6 | 5 | 4 | 3 | 2 | 1 | 0" |

should be,

UNITED STATES PATENT OFFICE
CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below:

| ⊕ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 1 | 0 | 3 | 2 | 5 | 4 | 7 | 6 | 9 | 8 | 11 | 10 | 13 | 12 | 15 | 14 |
| 2 | 2 | 3 | 0 | 1 | 6 | 7 | 4 | 5 | 10 | 11 | 8 | 9 | 14 | 15 | 12 | 13 |
| 3 | 3 | 2 | 1 | 0 | 7 | 6 | 5 | 4 | 11 | 10 | 9 | 8 | 15 | 14 | 13 | 12 |
| 4 | 4 | 5 | 6 | 7 | 0 | 1 | 2 | 3 | 12 | 13 | 14 | 15 | 8 | 9 | 10 | 11 |
| 5 | 5 | 4 | 7 | 6 | 1 | 0 | 3 | 2 | 13 | 12 | 15 | 14 | 9 | 8 | 11 | 10 |
| 6 | 6 | 7 | 4 | 5 | 2 | 3 | 0 | 1 | 14 | 15 | 12 | 13 | 10 | 11 | 8 | 9 |
| 7 | 7 | 6 | 5 | 4 | 3 | 2 | 1 | 0 | 15 | 14 | 13 | 12 | 11 | 10 | 9 | 8 |
| 8 | 8 | 9 | 10 | 11 | 12 | 13 | 14 | 15 | 0 | 1 | 2 | 3 | 4 | 5 | 6 | 7 |
| 9 | 9 | 8 | 11 | 10 | 13 | 12 | 15 | 14 | 1 | 0 | 3 | 2 | 5 | 4 | 7 | 6 |
| 10 | 10 | 11 | 8 | 9 | 14 | 15 | 12 | 13 | 2 | 3 | 0 | 1 | 6 | 7 | 4 | 5 |
| 11 | 11 | 10 | 9 | 8 | 15 | 14 | 13 | 12 | 3 | 2 | 1 | 0 | 7 | 6 | 5 | 4 |
| 12 | 12 | 13 | 14 | 15 | 8 | 9 | 10 | 11 | 4 | 5 | 6 | 7 | 0 | 1 | 2 | 3 |
| 13 | 13 | 12 | 15 | 14 | 9 | 8 | 11 | 10 | 5 | 4 | 7 | 6 | 1 | 0 | 3 | 2 |
| 14 | 14 | 15 | 12 | 13 | 10 | 11 | 8 | 9 | 6 | 7 | 4 | 5 | 2 | 3 | 0 | 1 |
| 15 | 15 | 14 | 13 | 12 | 11 | 10 | 9 | 8 | 7 | 6 | 5 | 4 | 3 | 2 | 1 | 0 |

Table I - Dyadic Addition --.

UNITED STATES PATENT AND TRADEMARK OFFICE

CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below:

Column 4, line 61, "Theorem 1: $W_m(x)W_n(x) = W_m$ ♀ $_n(x)$" should be

--Theorem 1: $W_m(x)W_n(x) = W_{m♀n}(x)$--.

Column 4, line 67, "$x\varepsilon(0,1)$" should be --$x\varepsilon(0,1]$--.

Column 5, line 13, "j=0 to N of αjWj(x)" should be

--j=0 to N of $\alpha_j W_j(x)$--.

Column 5, line 17, "$\Sigma^M_{k=0}\, a_k W_k(x) = \frac{1}{\Sigma^N_{j=0}\, \alpha_j W_j(x)}$ ," should be --$\sum_{k=0}^{M} a_k W_k(x) = \frac{1}{\sum_{j=0}^{N} \alpha_j W_j(x)}$ ,--.

Column 5, line 26, "$\sum_{k=0}^{M} \sum_{j=0}^{N} a_k \alpha_j W_k{}^{♀}{}_j(x) = 1$ ." should be --$\sum_{k=0}^{M} \sum_{j=0}^{N} a_k \alpha_j W_{k♀j}(x) = 1$ .--.

Column 5, line 32, "k ♀j" should be --k♀j--.

Column 5, line 33, "ι=k♀j, then j=ι♀k" should be

--ι=k♀j, then j=ι♀k--.

UNITED STATES PATENT AND TRADEMARK OFFICE

CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below:

Column 5, lines 36 and 37, " $\sum_{\iota=0}^{\max (k♀j)} W\iota \quad (x) \sum_{k=0}^{M} a_k \alpha_{k♀\iota} = 1$ ."

should be -- $\sum_{\iota=0}^{\max (k♀j)} W_\iota (x) \sum_{k=0}^{M} a_k \alpha_{k♀\iota} = 1$ .--.

Column 5, line 41, "M of $a_k \alpha_k$ 1," should be --M of $a_k \alpha_{k♀\iota}$--.

Column 5, line 48, " $\sum_{k=0}^{M} a_k \alpha_{k♀\iota} = \delta_{\iota,0}$; $\iota = 0,1,2,\ldots,$ max $(k♀j)$"

should be -- $\sum_{k=0}^{M} a_k \alpha_{k♀\iota} = \delta_{\iota,0}$ ; $\iota = 0,1,2, \ldots ,$ max $(k♀j)$--.

Column 5, line 53, "if" should be --is--.

Column 5, line 58, "$M+1=2^P$, p an integer. Adding $\alpha k \; ♀_\iota = 0$ for $k \; ♀ \; 1>N$" should be --$M+1=2^P$, p an integer. Adding $\alpha_{k♀\iota} = 0$ for $k♀\iota>N$--.

Column 5, line 61, "$a_k \; ♀_\iota \neq 0$" should be --$|\alpha_{k♀\iota}| \neq 0$--.

Column 5, lines 62 and 63, $\sum_{j=0} \alpha j W j (x) \neq 0$, for all $x \varepsilon$ (0,1)"

should be -- $\sum_{j=0}^{N} \alpha_j W_j (x) \neq 0$, for all $x \varepsilon (0,1]$--.

Column 6, line 5, "If $\alpha,\beta\varepsilon$ where" should be --If $\alpha,\beta \varepsilon S$ where--.

UNITED STATES PATENT AND TRADEMARK OFFICE

CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below:

Column 6, line 6, "α ♀ β" should be --α♀β--.

Column 6, line 7, "α ♀ β" should be --α♀β--.

Column 6, line 9, "(α.β), α.βεS" should be --(α♀β), α,βεS--.

Column 6, line 13, "an" should be --in--.

Column 6, line 53, "$a_0\alpha_1 + a_1\alpha_0 + a_2\alpha_3 + a_3\alpha_2 + 0$" should be --$a_0\alpha_1 + a_1\alpha_0 + a_2\alpha_3 + a_3\alpha_2 = 0$--.

Column 7, line 2, "x" should be an italic letter to be consistent with printing usage.

Column 7, lines 5-8, "$\frac{1}{\sum_{j=0}^{3} \alpha_j}$" should be -- $1 \Big/ \sum_{j=0}^{3} \alpha_j$--.

Column 7, line 37, "S(t). N(t)" should be --S(t)·N(t)--.

Column 7, line 45, "in" should be --on--.

Column 8, line 10, "fucntions" should be --functions--.

Column 8, line 29, "S(t).N(t)" should be --S(t)·N(t)--.

Column 8, line 48, "S(t).N(t)" should be --S(t)·N(t)--.

Column 10, line 13, after "changing" insert --an--.

Column 10, lines 32 and 33, "one, two, three and four" should be -- ①, ②, ③ and ④ --.

UNITED STATES PATENT AND TRADEMARK OFFICE

CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below:

Column 10, line 54, "(1-2-3+4)" should be --(1-2-3+4)--.

Column 10, line 66, "N/2N/2" should be --N/2,N/2--.

Column 11, line 51, "$\sum_{i=0}^{M} a_j W_i \sum_{j=0}^{N} \alpha_j W_j = \sum_{i=0}^{M} \sum_{j=0}^{N} a_i \alpha_j W_{i+j}$"

should be -- $\sum_{i=0}^{M} a_i W_i \sum_{j=0}^{N} \alpha_j W_j = \sum_{i=0}^{M} \sum_{j=0}^{N} a_i \alpha_j W_{i+j}$ --.

Column 11, line 65, "$\sum_{i=0}^{M} a_i W_i \sum_{j=0}^{N} \alpha_i W_j = \sum_{\iota=0}^{3} W_\iota \sum_{i=0}^{3} a_i \alpha_{i+\iota}$"

should be -- $\sum_{i=0}^{M} a_i W_i \sum_{j=0}^{N} \alpha_j W_j = \sum_{\iota=0}^{3} W_\iota \sum_{i=0}^{3} a_i \alpha_{i+\iota}$ --.

Column 12, line 68, after "control", first occurence, delete --of control switching network 104 op- --.

Column 13, line 1, before "of control unit 114", delete --erated under the control--.

Column 13, line 31, "(k;1)" should be --(k,1)--.

Column 13, line 34, "$\alpha_k^3+2 \prod_{i\neq k}^{3} \alpha_i-\alpha_k \sum_{i\neq k}^{3} \alpha_i^2, k = 0,1,2,3$"

should be -- $\alpha_k^3 + 2 \prod_{i\neq k}^{3} \alpha_i - \alpha_k \sum_{i\neq k}^{3} \alpha_i^2$ , $k = 0,1,2,3$ --.

UNITED STATES PATENT AND TRADEMARK OFFICE

CERTIFICATE OF CORRECTION

PATENT NO. : 3,925,646

DATED : December 9, 1975

INVENTOR(S) : RICHARD L. RICHARDSON, ET AL

It is certified that error appears in the above-identified patent and that said Letters Patent are hereby corrected as shown below:

Column 13, line 37, "where $\pi$" should be --where $\Pi$--.
Column 14, line 29, "iis" should be --is--.

Column 17, line 48, "k=0 to $2^P-1$" should be --k=0 to $2^P-1$--.

Column 17, line 51, "$2^P-1$" should be --$2^P-1$--.

Column 18, lines 18 and 19, "$\Sigma^M_{k=0} a_k W_k (x)$" should be --$\sum_{k=0}^{M} a_k W_k (x)$--.

Column 18, lines 23 and 24, "$\Sigma^N_{j=0} \alpha_j W_j (x)$" should be --$\sum_{j=0}^{N} \alpha_j W_j (x)$--.

Column 18, line 68, "wavecomponents" should be --wave components--.

Signed and Sealed this

*Twenty-third* Day of *May 1978*

[SEAL]

*Attest:*

RUTH C. MASON
*Attesting Officer*

LUTRELLE F. PARKER
*Acting Commissioner of Patents and Trademarks*